Feb. 14, 1956 F. H. HANLEY 2,734,935

SELECTIVE CALL CIRCUIT FOR SIGNALING SYSTEMS

Filed Oct. 5, 1950 2 Sheets-Sheet 1

INVENTOR
F. H. HANLEY
BY
H. A. Satterson
ATTORNEY

Feb. 14, 1956 F. H. HANLEY 2,734,935

SELECTIVE CALL CIRCUIT FOR SIGNALING SYSTEMS

Filed Oct. 5, 1950 2 Sheets-Sheet 2

INVENTOR
F. H. HANLEY
BY H. A. Patterson
ATTORNEY

United States Patent Office 2,734,935

Patented Feb. 14, 1956

2,734,935

SELECTIVE CALL CIRCUIT FOR SIGNALING SYSTEMS

Frank Harold Hanley, Butler, N. J., assignor to American Telephone and Telegraph Company, a corporation of New York Application October 5, 1950, Serial No. 188,547

5 Claims. (Cl. 178—2)

Figure 1:
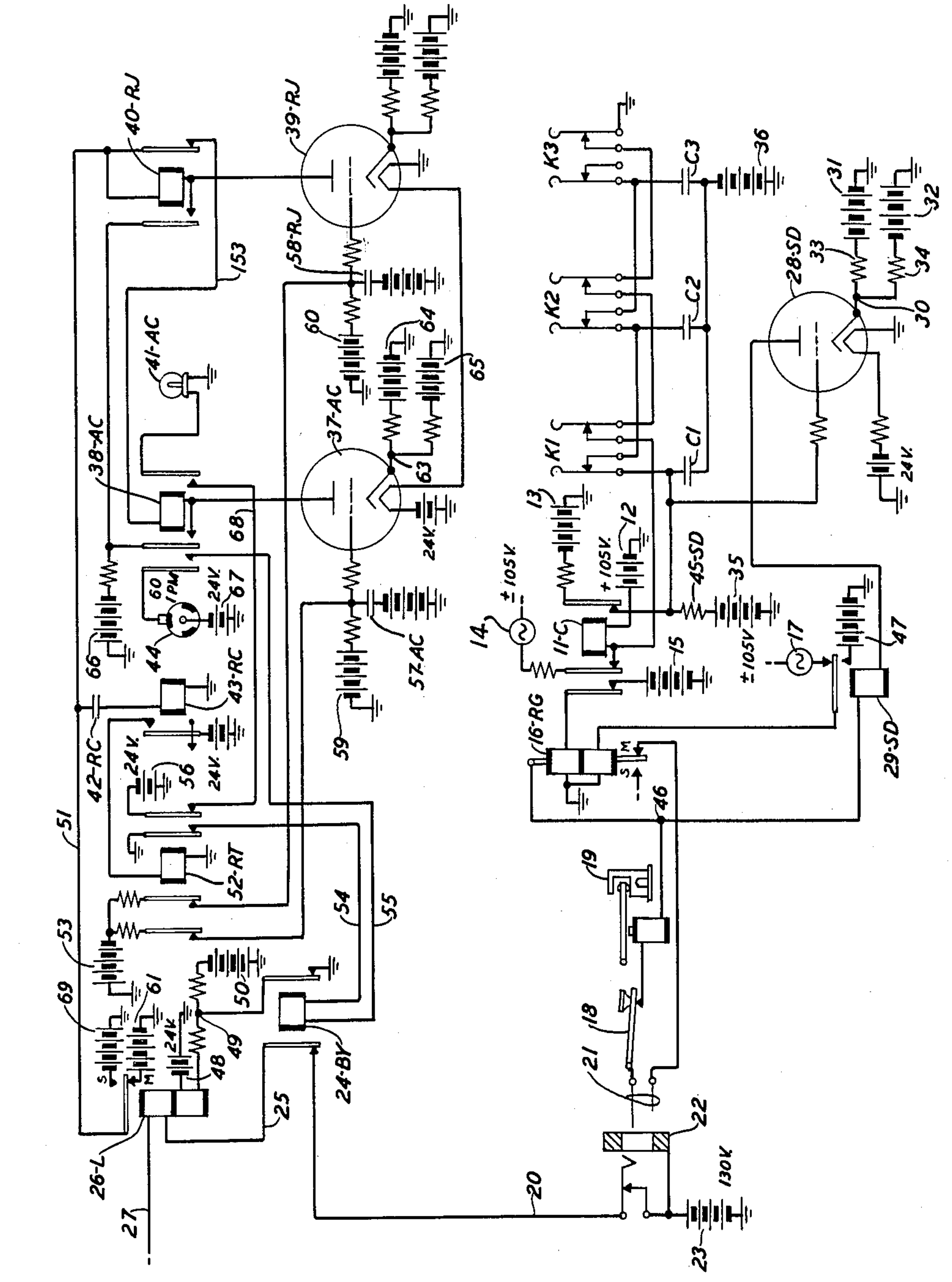

The invention relates to an intercommunicating signaling system and more particularly to means at each of the stations of such system for selectively calling any one or more of the other stations over an interconnecting circuit, and means at each of the stations upon selection by any other of the stations for furnishing busy signals to the circuit.

An object of the invention is to selectively call any one of a plurality of stations of an intercommunicating signaling system by means of a ringing current signal of a distinctive given duration and to prevent by means of the same signal any of the other stations to which is assigned a calling signal of a lesser given duration, from accepting the call.

Another object is to automatically furnish at the called, or wanted, station in response to the properly assigned ringing current call signal, busy signals for transmission back over the circuit, the busy signals serving to indicate at any of the other stations whereat an attempt may be made to initiate a call at this time, that the circuit is busy.

In accordance with the present invention a plurality of stations interconnected by a transmission medium, are arranged to be individually selected for communication purposes from any one of the other stations by means of a ringing current impulse transmitted from the calling one of said stations. At each station is provided a non-locking key for calling each of the other stations and each key in cooperation with a sending vacuum tube timing and relay circuit common to all keys at the station, is arranged to send a ringing current signal impulse of a distinctive given duration. The receiving selector at each station comprises two receiving vacuum tube timing circuits and respectively associated relays. One of the receiving vacuum tube timing and relay circuits is arranged when operated to light a signal, or calling, lamp in response to a ringing current signal of a distinctive given duration incoming from the transmission medium and the other is arranged when operated to disable the first-mentioned receiving vacuum tube timing and relay circuit in response to an incoming ringing current signal of longer duration. Whenever the first-mentioned receiving vacuum tube timing and relay circuit at a called station is operated and locked, it causes busy signals to be automatically transmitted over the transmission medium whereby any other station attempting to initiate a call at this time will receive such signals to operate a busy indicating device. The busy signal transmitted from the called station furnishes an indication to the attendant at the calling station that a selection previously established is still in effect and that the operated selecting key may be released. The attendant at the called station upon observing the lighted signal lamp answers by any suitable means to thereby restore the first-mentioned receiving vacuum tube timing and relay circuit to normal, extinguish the signal calling lamp and discontinue the transmission of the busy signals.

A feature of the invention is that it provides at each station of an intercommunicating signaling system a relatively simple selective calling unit normally disconnected from the circuit of such system but arranged to be readily applied to the circuit to initiate a call to any of the other stations of the system.

Another feature is the provision of means whereby all stations of a specified number of stations connected in an intercommunicating system could be selectively called for simultaneous connection for conference or broadcast purposes.

Another feature is the provision of a single transmitting unit at any one of a plurality of interconnected stations arranged to be readily switched from one to another of a plurality of interconnecting circuits terminating at such one of said stations.

The above-mentioned objects may be achieved in any type of intercommunication system, such as telephone, telegraph, radio or the like. The following description is directed to a Morse code telegraph signaling system.

Figure 2:
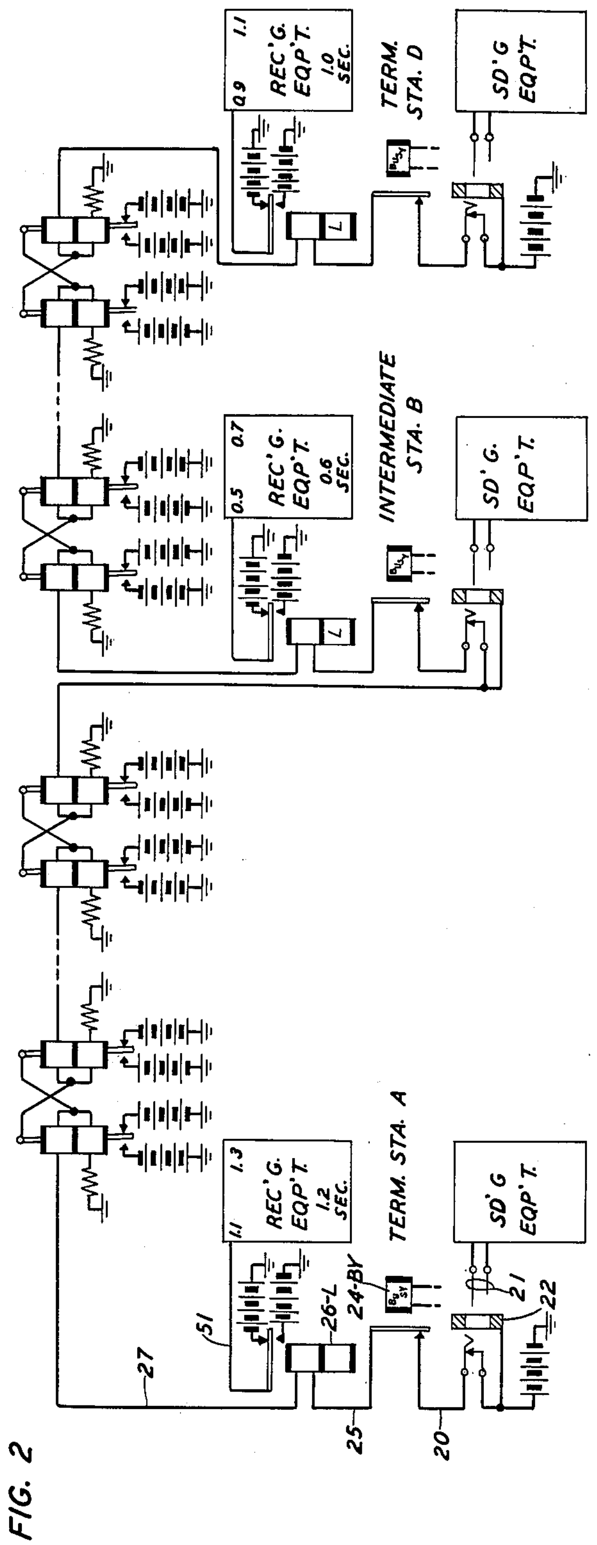

Other objects and features will be obvious from the following specification and drawings of which:

Fig. 1 shows a schematic circuit at any one of a plurality of stations interconnected in an intercommunicating Morse code telegraph system, the sending equipment being shown in the lower portion and the receiving equipment in the upper portion; and Fig. 2 shows a line circuit interconnecting, in series, a plurality of station circuits respectively located at a plurality of stations such as stations A, B and D. The station circuits are represented by their respective line relays such as line relay 26–L shown in Fig. 1.

In the drawing like parts have the same reference characters and the values furnished for the various sources of potentials, resistors and condensers, etc. are arbitrarily chosen. In actual practice a single source of current is furnished at each station to serve each of the three different sources shown in Fig. 1, that is, one source serves those indicated as sources of grounded 130 volts positive and grounded 130 volts negative, another serves those indicated as sources of grounded 24 volts negative, still another serves those indicated as sources of ±105 volts ringing current, and the grounded 105 volts positive.

Referring to Fig. 1, the sending unit shown in the lower portion of the drawing is arranged to be plugged into any jack circuit appearance of any line circuit at a switchboard. The sending unit comprises non-locking selecting keys K–1, K–2 and K–3 for respectively selecting other stations connected in the line circuit, the selection being controlled by condensers C–1, C–2 and C–3, respectively associated with keys K–1, K–2 and K–3. Condensers C–1, C–2 and C–3 have different capacities, that is, condenser C–1 may be of 0.6 microfarad, C–2 of 0.8 microfarad and C–3 of 1.0 microfarad. The condensers having these values control the transmission of ringing current signals having durations assumed to be of the order of 0.6, 0.8 and 1.0 second respectively. In order to select the station shown in Fig. 1, assumed herein to be station A, apart from any of the other stations connected to the line circuit, a corresponding selecting key and an associated condenser are provided at each of the other stations and the capacity of such condenser may be assumed to be of 1.2 microfarads so that a calling signal of ringing current for station A sent out from any of the other stations would have a duration of the order of 1.2 seconds. Each key, when operated, causes to be transmitted over the line circuit to each of the other stations a ringing current signal of a distinctive given duration, and the station for which the call is intended is furnished with an indication that a call is awaiting on the circuit, and the other stations for which the call is not intended have means responsive to the calling signal for preventing such indication being furnished at their respective stations. It is understood, however, that the preventing means are responsive at only those stations to which are assigned selecting, or calling, signals of duration less than that of the signal transmitted to select the wanted station.

Normally, relay 11–C is maintained in an energized condition by a circuit traceable from source 12 of grounded positive potential of 105 volts, through the relay winding and the right-hand contacts, in series, of keys K–1, K–2 and K–3, to ground. Relay 11–C in its operated position connects (1) at its right-hand armature source 13 of grounded negative potential of 130 volts to source 35 of grounded positive potential of 130 volts whereby condensers C–1, C–2 and C–3 are normally maintained in substantially discharged condition; (2) at its inner left-hand armature ringing generator 14 for furnishing ringing current of 20 cycles per second of ±105 volts for a purpose hereinafter described; and (3) at its outer left-hand armature source 15 of grounded positive potential of 130 volts for normally maintaining ringing relay 16–RG in its marking position by a relatively strong current flowing in the upper winding of the relay. The current flowing in the upper winding of relay 16–RG predominates over any current flowing in the lower winding of the relay whereby the relay is normally held in its marking position. Relay 16–RG is of the polarized type and is arranged to be operated through its lower winding to its alternately spacing and marking positions by ringing current of 20 cycles per second of ±105 volts furnished by ringing generator 17 when a calling signal is being transmitted to the other stations connected in the line circuit, at which time the circuit of the upper winding is open.

Upon initiating a call the attendant at the calling station connects the local telegraph set comprising transmitting key 18 and sounder 19 to conductor 20 by inserting plug 21 into jack 22. With ringing relay 16–RG in its marking position the telegraph set at the local station is therefore conected to the line circuit which normally is traceable from source 23 of grounded positive potential 130 volts (providing the call is initiated at a terminal station as will be hereinafter shown in Fig. 2), conductor 20, back contact and left-hand armature of busy relay 24–BY, conductor 25, through the upper winding of line relay 26–L, line conductor 27 to a source of grounded negative potential of 130 volts in a repeater shown in Fig. 2. The line relay at each of the stations is normally held in its marking position before and after the local telegraph set is connected to the line circuit and before signaling starts.

A triode 28–SD of the vacuum tube type is provided in the sending unit and has its grid element connected to each of condensers C–1, C–2 and C–3 in parallel and its plate element connected to a path extending through the winding of relay 29–SD, armature and the right-hand, or marking, contact of ringing relay 16–RG, sleeve of plug 21 and jack 22, to source 23 of grounded positive potential. The cathode of triode 28–SD is connected to point 30 of a potentiometer arrangement which interconnects sources 31 and 32 of grounded positive and grounded negative potentials, respectively, of 130 volts through resistors 33 and 34. The potentiometer arrangement on the cathode ensures that any changes in the charging voltages will not appreciably affect the timing of the selecting signal. The arrangement is such that whether the charging voltages are higher or lower, equal or unequal, the cathode potential will be such that it will automatically compensate for an increase or a decrease in the charging rate due to a higher or lower charging potential. It is assumed that when the difference in potential between the grid and the cathode is zero, plate current will flow to operate relay 29–SD. For regulating the voltage at point 30 there are provided resistors 33 and 34 having equal resistance values which are low compared with the resistance value of the plate circuit of triode 28–SD. The voltage on the cathode of the triode 28–SD is of zero value when the potential values applied by sources 31 and 32 are equal. In the case where a call is from station A shown in Fig. 1 to a station arranged to be selected through key K–1, the operation of key K–1 would cause the potential impressed on the grid element of triode 28–SD to also become zero when condenser C–1 was charged to one-half of the applied voltage of positive 130 volts from source 35 and negative 130 volts from source 36. In other words, current flows in the plate circuit of triode 28–SD to operate relay 29–SD after condenser C–1 is charged to one-half of the applied voltage which for condenser C–1 would require an interval of 0.6 second duration.

Should, for example, the applied voltages of sources 31 and 32 be respectively changed from positive 130 volts to positive 134 volts and from negative 130 volts to negative 126 volts the cathode potential would become one-half of the difference between the potential values of sources 31 and 32, that is, positive 4 volts. In the same length of time as before, say 0.6 second duration, the grid of triode 28–SD would be charged to one-half of the difference between 134 volts and 126 volts, that is, 4 volts, therefore the potential on the grid of triode 28–SD at the end of the 0.6 second interval would be positive 4 volts, the same as the potential applied to the cathode by sources 31 and 32, and plate current would flow to operate relay 29–SD.

Should, in a second example, the applied voltage of source 31 be changed from positive 130 volts to positive 120 volts and that of source 32 remain unchanged at negative 130 volts, the cathode potential in triode 29–SD would also become one-half of the difference between the potential value of sources 31 and 32 which in this case would be negative 5 volts. Since sources 35 and 36 are the same as sources 31 and 32, respectively, condenser C–1 would be charged to 125 volts which is one-half of the 250 volts applied voltage, at the end of the 0.6 second interval, the voltage on the grid element would then be the difference between the condenser voltage of 125 volts and the applied voltage of 120 volts or negative 5 volts, the same as the potential of the cathode. In this case, the voltage between the cathode and the plate element of triode 28–SD would be reduced to 125 volts, but this difference would have negligible effect on the duration of time required for relay 29–SD to operate inasmuch as the plate current in the triode is affected considerably less by a change in the plate voltage than by an equivalent change in the grid voltage.

The potentiometer arrangement connected to the cathode of triode 28–SD also tends to compensate in this respect, inasmuch as in the second example, the plate voltage is reduced from positive 130 volts to positive 120 volts (a reduction of 10 volts) whereas the difference between the plate and the cathode is 125 volts (a reduction of 5 volts). Therefore, for any selecting signal of a given duration, say, 0.6 second as required to charge condenser C–1, relay 29–SD is assumed to be adjusted to operate when the plate current reaches the value present when the difference in the potetnial between the grid element and the cathode of triode 28–SD is zero volts.

The upper part of Fig. 1 shows the receiving equipment which comprises an accept vacuum tube timing and relay circuit including triode 37–AC and relay 38–AC, and a reject vacuum tube timing and relay circuit including triode 39–RJ and relay 40–RJ. The accept vacuum tube timing and relay circuit is arranged to light signal lamp 41–AC when a ringing signal of the given duration assigned to the station shown in Fig. 1 is received from any one of the other stations. The reject vacuum tube timing and relay circuit is arranged to disable the above-mentioned accept vacuum tube timing and relay circuit when the incoming ringing current signal is of longer duration than that assigned to operate the associated accept vacuum tube timing and relay circuit. Other stations to which are assigned ringing current signals of longer duration are not affected by the assigned ringing current signals of shorter duration.

A circuit path resonant to the ringing current signals repeated by line relay 26–L comprises condenser 42–RC and an alternating or ringing current relay 43–RC which is of the slow-release type. Relay 43–RC operates in response to all ringing current signals incoming over the line circuit and remains operated for the duration of each signal, and because of its slow-release character it remains operated for a short time thereafter.

In order to gain margin of operation the accept and the reject apparatus of the receiving equipment are adjusted to operate over ranges of time values above and below the respective values assigned to the calling signals as originally transmitted, there being avoided particularly any overlapping in these ranges of time values. For example, in a case where the transmitted signal originally has a duration of 0.6 second, it might, due to variables in the circuit, be shortened to say 0.52 second duration or lengthened to say 0.68 second duration and in order to compensate for this the accept apparatus is adjusted to operate after an interval of say 0.5 second duration; and the reject apparatus, for the same reason, is adjusted to operate after an interval of say 0.7 second duration. In other words, the reject apparatus is adjusted to operate in response to any signal longer in duration than 0.7 second which corresponds to the allowable minimum operate time of the accept apparatus at the next succeeding station.

Accordingly, for signals which have a duration of 0.6, 0.8, 1.0 and 1.2 seconds at the transmitting end of the line circuit the accept apparatus of the receiving equipment at the respective stations B, C, D and A would be adjusted to respond to signals of durations of 0.5, 0.7, 0.9 and 1.1 seconds, respectively. The reject apparatus of the receiving equipment at such stations would be adjusted to respond to signals of 0.7, 0.9, 1.1 and 1.3 durations, respectively.

METHOD OF OPERATION

*To call another station*

The local attendant at station A shown in Fig. 1, to originate a call to another station, connects the local telegraph set to the line circuit by inserting plug 21 into jack 22. If the line circuit is not busy as indicated by the silence of the sounder of the telegraph set, he depresses the proper calling key for selecting the desired station. A timed 20-cycle ringing signal from generator 17 will be sent over the line circuit and this signal will be heard on the sounder of the local set. The accept apparatus of the receiving equipment at the distant selected station automatically responds to the calling signal and causes the line circuit to open and close slowly in response to impulses from a 60-impulse per minute interrupter. Assume that station B is called from station A, the sending equipment at station A is shown in the lower portion of Fig. 1, and it is further assumed that the receiving equipment shown in the upper portion of Fig. 1 is that at station B. As hereinbefore stated, it is assumed that the accept apparatus of the receiving equipment at station B is adjusted to respond effectively to a ringing current signal of 0.5 second in duration and that key K–1 which is assigned for calling station B, is arranged to transmit a selecting signal of a duration of 0.6 second. When key K–1 is depressed, it opens at its right-hand contact the operating circuit for normally operated relay 11–C.

It was hereinbefore stated that relay 11–C is normally held operated by a current flowing in a path extending from source 12 of grounded positive potential of 105 volts, through the winding of the relay, right-hand contacts, in series, of keys K–1, K–2 and K–3 to ground and that there is another path extending from source 12 through the winding of the relay, front contact and inner left-hand armature of the relay, to ringing generator 14, for furnishing ringing current of ±105 volts. During an interval when that part of a cycle of ringing current from ringing generator 14 is positive in polarity and is impressed on the winding of relay 11–C immediately following the operation of key K–1, the relay releases. Relay 11–C upon releasing, (1) disconnects at its inner left-hand armature and front contact ringing generator 14 from the relay winding; (2) disconnects at its outer left-hand armature and front contact source 15 of grounded positive potential of 130 volts from the upper winding of polarized ringing relay 16–RG; and (3) disconnects at its right-hand armature and front contact source 13 of grounded negative potential of 130 volts from the circuit path extending through resistor 45–SD to source 35 of grounded positive potential of 130 volts. Relay 16–RG which is normally maintained in its marking, or right-hand, position by current flowing from source 15 of grounded positive potential of 130 volts, now responds to the ringing current flowing through its lower winding from generator 17 and transmits over a circuit having two parallel paths, a pulsating current corresponding in frequency to the ringing current of generator 17, the circuit being traceable from source 23 of positive potential of 130 volts, sleeve of jack 22 and plug 21, marking, or right-hand, contact and armature of relay 16–RG and then over the two parallel paths. One of these paths extends through the winding of the magnet of sounder 19, telegraph key 18, tip of plug 21 and jack 22, conductor 20, contact and left-hand armature of busy relay 24–BY, conductor 25, through the upper winding of line relay 26–L, then over line circuit 27, to a source of grounded negative potential of 130 volts in a repeater shown in Fig. 2. The repeater repeats the pulsating current repeated by ringing relay 16–RG through a second repeater to the line relay at station B which in the case herein described is assumed to be another line relay corresponding to line relay 26–L. The other of the above-mentioned paths affected by relay 16–RG responding to the ringing current in its lower winding extends from connecting point 46, through the winding of relay 29–SD to the plate of vacuum tube 28–SD of the sending unit.

In order to effect proper timing of the ringing current signals it is essential that such signals be substantially undistorted and in order to ensure this, each timed ringing current signal must begin and end at a time when ringing source 17 is supplying positive, or marking, current. When the ringing call key for any of the wanted stations is depressed relay 11–C remains locked operated by current due to any difference in potential between ringing generator 14 and source 12. When the voltage of generator 14 reaches positive 105 volts no current will flow in the winding of relay 11–C and the relay will release. In this way ringing relay 16–RG which is normally in its marking position will when under the control of ringing generator 17, after relay 11–C releases, start to send the ringing crrent signal with a marking pulse, for transmission to the called, or wanted, station.

As hereinbefore stated, the release of relay 11–C disconnected source 13 of grounded negative potential from source 35 of grounded positive potential whereupon the positive potential of 130 volts of source 35 is impressed on a circuit traceable through resistor 45–SD, condenser C–1 to source 36 of grounded negative potential of 130 volts. When the charge on condenser C–1 attains a value sufficient to make triode 28-SD conducting, which requires a time interval of 0.6 second duration as hereinbefore stated, the grid of vacuum tube 28–SD becomes charged to a potential equal to that of the cathode of the tube to cause a current to flow from source 23 of grounded positive potential of 130 volts, sleeves of jack 22 and plug 21, marking contact and armature of relay 16–RG, through the winding of relay 29–SD, plate and cathode of vacuum tube 28–SD, to point 30. The potentiometer arrangement for furnishing a satisfactory potential to the cathode provides a good balancing means for any slight difference in voltages, say ±5 volts in the 130-volt sources 31 and 32 connected to point 30. Relay 29–SD operates to disconnect at its armature and back contact ringing generator 17 and connects at its armature and front contact source 47 of grounded positive potential of 130 volts to the lower winding of ringing relay 16-RG. Relay 16–RG which had been during the time when condenser C–1 was charging to its assigned capacity, receiving in its lower winding the ringing current from generator 17 and had consequently been moving its armature between its associated contacts, now energizes to a steady state under the influence of a steady current flowing through its lower winding from source 47. Thus relay 16–RG is maintained in its marking position. A grounded positive potential of 130 volts furnished by source 23 is now steadily impressed on the plate of vacuum tube 28–SD to maintain the tube conducting. The steady state of relay 16–RG stops the transmission of the calling ringing current signal over the line circuit to station B. Because relay 29–SD operates and applies steady marking current to the lower winding of relay 16–RG at a time when relay 16–RG is in the marking condition, the final spacing impulse of the ringing current is not cut short, but is of full duration.

When the ringing current signal, say of 20 cycles current, is received at station B it causes the line relay thereat, say line relay 26–L, to operate accordingly. Line relay 26–L is normally biased to its marking position by current flowing in a circuit extending from source 48 of grounded negative potential of 24 volts, through the lower winding of the relay, to point 49, to ground, point 49 being grounded through the right-hand armature and back contact of busy relay 24–BY and being also connected through a resistor to source 50 of negative potential of 130 volts. A signal corresponding to the ringing current signal is produced at the upper armature of relay 26–L and repeated over a circuit extending over conductor 51, receiving condenser 42–RC, through the winding of receiving ringing current relay 43–RC, to ground. As hereinbefore stated, condenser 42–RC and relay 43–RC are resonant to 20 cycles. Relay 43–RC being of the alternating-current type and slow to release, will be held operated while line relay 26–L is following the cycles of the ringing signal. Relay 43–RC, upon operating, closes at its armature and contact an obvious operating circuit for relay 52–RT which operates and remains operated for the duration of the timed interval in which the calling signal is being received. In the event that Morse signals should constitute a message transmitted over the line circuit, relay 26–L would follow such Morse signals but would have no effect on relay 43-RC. A Morse signal does not produce a sustained frequency of 20 cycles, and relays 43–RC and 52–RT are not maintained operated in response to such signals sufficiently long to cause the receiving equipment, or selector, to be operated falsely.

Relay 52–RT, upon operating, disconnects (1) at its two left-hand armatures source 53 of grounded negative potential of 130 volts from the grid circuits of vacuum tubes 37–AC and 39–RJ; (2) at its inner right-hand armature ground from a circuit extending over conductor 54, through the winding of busy relay 24–BY, conductor 55, front contact and outer left-hand armature of unoperated relay 38–AC, to prevent the busy relay from operating during the reception of the calling signal; and (3) at its outer right-hand armature source 56 of grounded negative potential of 24 volts to prevent signaling lamp 41–AC from lighting during the reception of the calling signal. The disconnection of source 53 from the respective grid circuits of vacuum tubes 37–AC and 39–RJ causes condensers 57–AC and 58–RJ to begin charging during the reception of the calling signal. The capacity of condenser 57–AC is such that when relay 52–RT has been held operated for the timed interval of 0.5 second duration, the condenser will be charged to a potential sufficient to operate vacuum tube 37–AC. Plate current in vacuum tube 37–AC will now be able to flow. Each time line relay 26–L operates to its marking contact immediately following the instant when the potential difference between the grid and the cathode of vacuum tube 37–AC becomes zero in value, source 61 of grounded positive potential of 130 volts becomes connected in a circuit traceable over the marking, or front, contact of relay 26–L, conductor 51, right-hand armature and back contact of relay 40–RJ, conductor 153, through the winding of relay 38–AC, plate and cathode of vacuum tube 37–AC to point 63 of a potential value between that of source 64 of grounded positive potential of 130 volts and that of source 65 of grounded negative potential of 130 volts. Relay 38–AC operates and then locks when line relay 26–L returns to its normal position at the end of a calling signal, which position is steady marking, the locking circuit being traceable over the the left-hand armature and front contact of relay 38–AC to source 66 of grounded negative potential of 130 volts. Condenser 57–AC, vacuum tube 37–AC and relay 38–AC constitute the accept apparatus of the receiving equipment.

Condenser 58–RJ upon being charged, requires a timed interval of say, at least, 0.7 second duration to cause a zero difference in the potential values impressed on the cathode and grid, respectively, of vacuum tube 39–RJ, at which time vacuum tube 39–RJ becomes conducting. However, at the end of the calling signal for station B, which signal has a duration of approximately 0.6 second, condenser 58–RJ is not sufficiently charged in this interval of time to impress on the grid of vacuum tube 39–RJ the voltage required to make the tube conducting and relay 40–RJ in the plate circuit of vacuum tube 39–RJ does not operate at this time. As long as relay 40–RJ remains unoperated and the calling signal is being received, relays 43–RC and 52–RT will remain operated since line relay 26–L continues to make and break the operating circuit for slow-to-release relay 43–RC in response to the incoming calling signal. When the incoming calling signal stops, the armature of line relay 26–L will be positioned to its marking contact and accordingly relay 38–AC of the accept apparatus, as hereinbefore stated, will be locked operated. Shortly after line relay 26–L resumes its normal, or marking, position current will cease to flow through slow-release relay 43–RC and relay 43–RC will release followed by the release of relay 52–RT.

Relay 52–RT, upon releasing, (1) connects at its two left-hand armatures source 53 of grounded negative potential of 130 volts to sources 59 and 60, each of grounded positive potential of 130 volts, whereby condensers 57–RC and 58–RJ respectively connected to sources 59 and 60, become fully discharged; (2) connects ground at its inner right-hand armature and back contact to a circuit traceable over conductor 54, through the winding of busy relay 24–BY, conductor 55, front contact and outer left-hand armature of relay 38–AC, through current interrupter 44, to source 67 of grounded negative potential of 24 volts; and (3) connects source 56 of grounded negative potential of 24 volts at its outer right-hand armature and back contact to a circuit traceable over conductor 68, front contact and right-hand armature of relay 38–AC, signal lamp 41–AC, to ground, and lamp 41–AC lights. The discharge of condenser 57–AC causes vacuum tube 37–AC to become nonconducting but the discharge on condenser 58–RJ has no effect on vacuum tube 39–RJ at this time because vacuum tube 39–RJ is still unconducting. Busy relay 24–BY operates in response to the current interruptions, say of 60 impulses per minute received from interrupter 44, to alternately open and close the line circuit sixty times a minute, thus furnishing to other stations such as stations A, C and D an indication that the line circuit is busy in that a selection previously made is still in effect, the indication being given by means of the operation of the sounders at the other stations should the attendants at those stations during this busy interval plug their respective telegraph sets into the line circuit. Busy relay 24–BY upon operating, removes during each current impulse of the interrupted current, ground at its right-hand armature and contact from piont 49 and the removal of this shunt to ground causes current to flow in the circuit extending from grounded source 48 of negative potential of 24 volts, through the lower winding of relay 26–L, to grounded source 50 of negative potential of 130 volts. With no ground at point 49, the direction of current in the lower winding of relay 26–L is reversed. This reversal in the direction of current in the lower winding maintains line relay 26–L in its marking position during those intervals when busy relay 24–BY operates to open the line circuit in response to each current impulse furnished by interrupter 44. In this way the locking circuit for operated relay 38–AC is not opened and the relay is prevented from releasing and therefore signal lamp 41–AC is prevented from being extinguished during the transmission of busying signals.

When the attendant at called station B upon observing the lighted condition of signal lamp 41–AC, plugs his telegraph set into the line circuit jack and then at his telegraph set opens telegraph key 18, this will cause line relay 26–L to release during an interval when busy relay 24–BY is released in response to a "no current" impulse furnished by interrupter 44. Relay 26–L releases because at this time there is no current flowing in the upper winding of the relay and the current flowing in the lower winding has changed its direction of flow to aid the relay in releasing. Relay 26–L, upon releasing, removes source 61 of grounded positive potential of 130 volts and connects source 69 of grounded negative potential of 130 volts to the locking circuit for operated relay 38–AC thereby causing relay 38–AC to release, there now being grounded negative potentials of 130 volts connected to both ends of the locking circuit. Relay 38–AC, upon releasing, causes signal lamp 41–AC to be extinguished and interrupter 44 to be disconnected from the operating circuit for busy relay 24–BY which now becomes restored to its normally released condition.

*Calls to other stations*

Calls for each of the other stations operate in the same manner as just described in connection with a call from station A to station B except that the calling signals assigned to each of the other stations A, C and D would be, as hereinbefore stated, of different duration. In case of a call to station A the ringing current call signal of 20 cycles per second would be transmitted from the calling station, having a duration of 1.2 seconds but the accept apparatus of the receiving equipment at station A is adjusted to operate in response to a calling signal of an allowable minimum of 1.1 seconds duration. In a call to station C the transmitted calling signal at the calling station would be 0.8 second duration and the accept apparatus of the receiving equipment at station C is adjusted to operate in response to a calling signal of an allowable minimum of 0.7 second duration. In a call to station D the transmitted calling signal at the calling station would be 1.0 second duration and the accept apparatus of the receiving equipment at station D is adjusted to operate in response to a calling signal of an allowable minimum of 0.9 second duration. In any call to a particular station the ringing current call signal is also received at all the other, or unwanted stations. At those of the unwanted stations to which are assigned calling ringing current signals having durations shorter than that assigned to the wanted station, the reject vacuum tube and relay circuits would operate in response to the calling signal for the wanted station. The operation of the relays corresponding to relay 40–RJ of the reject vacuum tube and relay circuits at such other stations would prevent the transmission of the busy signal from these other stations. At those of the unwanted stations to which are assigned calling ringing current signals having durations longer than that assigned to the wanted station, no response to the calling signal is had because the condensers for both the accept and reject circuits at each of these stations require signals of longer duration to be effective.

*Line circuit schematic for a system*

Fig. 2 shows a terminal station A connected through an intermediate station B to another terminal station D, it being understood that one or more other intermediate stations may be connected between stations B and D. In between adjacent stations are connected a pair of repeaters whereby positive potential may be normally connected to the sleeve of the jack at each station to provide thereat a positive potential for energizing the plate-cathode path of the send vacuum tube and relay circuit as hereinbefore described in the call from station A to station B.

*Broadcast and conference calls*

For simultaneously connecting two or more stations to a line circuit, each of the wanted stations is called, in turn, and in response to a call the attendant at a wanted station connects his telegraph set to the line circuit, momentarily opens his message sending key and then transmits the Morse code signals identifying the selected wanted station. This is repeated at each of the wanted stations as it is selected until all the wanted stations are connected to the calling station for a broadcast or conference. The connections are maintained as long as the telegraph sets at the selected stations are plugged into their respective line jacks in the line circuit.

*Adaptation to other types of intercommunication systems*

The selector system shown in Fig. 1 may be readily adapted for use in radio carrier current systems by providing a send-receive reversal switch for connecting the winding of the line relay such as relay 26–L, to either the radio transmitter or the radio receiver, the radio receiver being normally connected to the line relay winding for receiving incoming signals. Morse code or teletypewriter code signals or voice frequencies may be transmitted over the transmitting medium whether it is a radio channel or a line circuit. The equipment respectively required for these different types of signaling may be readily provided in the radio transmitter and radio receiver and the proper signal sending and receiving apparatus may be arranged for connection to the radio equipment through contacts on the transmission reversal switch.

Two or more line circuits may terminate at any one station and the sending equipment at such station may be plugged into the line jack of any one of the line circuits for sending signals to selected stations interconnected by such selected line circuit.

What is claimed is:

1. In an intercommunicating signaling system, a plurality of stations, a transmission medium interconnecting said stations, a source of calling signals, call accepting means and locking means therefor, a source of busy signals and a plurality of manually operable selecting means at each of said stations, a plurality of timing means at each of said stations, one for each of the others of said stations and effective in response to the operation of one of said selecting means for transmitting from said source of signals at a calling one of said stations a calling signal of a distinctive given duration, other timing means at the wanted one of said stations responsive to the calling signal of a distinctive given duration transmitted from the calling station for operating the call accepting means and locking means therefor at said wanted station, and means controlled by said operated locking means for connecting the source of busy signals at said wanted station to said transmission medium.

2. In an intercommunicating signaling system, a plurality of stations, a transmission medium interconnecting said stations, and a source of calling signals, call accepting means and locking means therefor, call rejecting means and locking means therefor, a source of busy signals and a plurality of manually operable selecting means at each of said stations, a plurality of timing means at each of said stations, one for each of the others of said stations and effective in response to the operation of one of said selecting means for causing to be transmitted from said source of signals at a calling one of said stations a calling signal of a distinctive given duration, a plurality of other timing means at each of said stations respectively controlling the call accepting and the call rejecting means at its station, means in said other timing means at the wanted one of said stations responsive to the calling signal transmitted from said calling station for operating the call accepting means and the locking means therefor at said wanted station, means controlled by said operated locking means for transmitting to said transmission medium busy signals from the source at said wanted station, means responsive to a calling signal having a duration longer than that of the calling signal for its own station for operating its associated call rejecting means to prevent effective response of the call accepting means at its own station to the calling signal transmitted to select another of said stations, and means in said locking means for each of said operated call rejecting means arranged to maintain said preventing means operated for the duration of time that the busy signals are being transmitted to said transmission medium from said other station.

3. In a signaling system, a signaling channel, a plurality of stations associated therewith, means at said stations for transmitting selectively different station calling signals having like beginnings and different endings, signal responsive means and locking means therefor at each station selectively responsive to said calling signals, and other signal responsive means and locking means therefor at each station, said other signal responsive means being unoperable upon occurrence of the proper signal ending at the station but operable upon non-occurrence of the proper signal ending for unlocking the first-mentioned signal responsive means.

4. In a signaling system, a signaling channel, a plurality of stations associated therewith, means at said stations for transmitting selectively different station calling signals having like beginnings and different endings, signal responsive means and locking means therefor at each station selectively responsive to said calling signals, other signal responsive means and locking means therefor at each station, said other signal responsive means being unoperable upon occurrence of the proper signal ending at the station but operable upon non-occurrence of the proper signal ending for unlocking the first-mentioned signal responsive means, and means responsive to a call acknowledging signal for unlocking and restoring all operated and locked ones of said first-mentioned and said other signal responsive means.

5. In a signaling system, a signaling channel, a plurality of stations associated therewith, means at said stations for transmitting selectively different station calling signals having like beginnings and selectively different endings, a plurality of signal responsive means at each of said stations, means responsive to the beginning of a station calling signal for qualifying all of said signal responsive means to respond thereto, means for imparting to a first one of the calling signal responsive means at said stations the capability of operating selectively in response to different increments of said calling signal, means for locking the operated ones of said signal responsive means, means for imparting to a second one of the calling signal responsive means at each station the capability of operating in response to the next signal increment after the one causing the operation of the first calling signal responsive means at that station, and means operable by the second calling signal responsive means for unlocking said first calling signal responsive means at each station.

References Cited in the file of this patent

UNITED STATES PATENTS

| | | |
|---|---|---|
| 241,517 | Southworth | May 17, 1881 |
| 844,257 | Dean | Feb. 12, 1907 |
| 875,660 | Haig | Dec. 31, 1907 |
| 1,645,563 | Whistlecroft | Oct. 18, 1927 |
| 2,275,930 | Jorcheux | Mar. 10, 1942 |
| 2,455,724 | Bacon | Dec. 7, 1948 |
| 2,487,678 | Stickel | Nov. 8, 1949 |
| 2,495,452 | Grove | Jan. 24, 1950 |
| 2,540,115 | Hopkinson | Feb. 6, 1951 |
| 2,552,174 | Holloway | May 8, 1951 |
| 2,584,259 | Crane et al. | Feb. 5, 1952 |